(12) United States Patent
Ayoub

(10) Patent No.: US 11,390,171 B2
(45) Date of Patent: Jul. 19, 2022

(54) TRANSPORTATION PATHWAY AND METHOD OF FORMING SAME

(71) Applicant: Jason Ayoub Pty Limited, Hornsby (AU)

(72) Inventor: Jason Ayoub, Hornsby (AU)

(*) Notice: Subject to any disclaimer, the term of this patent is extended or adjusted under 35 U.S.C. 154(b) by 308 days.

(21) Appl. No.: 16/463,813

(22) PCT Filed: Nov. 23, 2017

(86) PCT No.: PCT/AU2017/051295
§ 371 (c)(1),
(2) Date: May 23, 2019

(87) PCT Pub. No.: WO2018/094467
PCT Pub. Date: May 31, 2018

(65) Prior Publication Data
US 2019/0275897 A1 Sep. 12, 2019

(30) Foreign Application Priority Data

Nov. 23, 2016 (AU) .............................. 2016904812

(51) Int. Cl.
*B60L 13/04* (2006.01)
*E01B 25/30* (2006.01)
(Continued)

(52) U.S. Cl.
CPC .............. *B60L 13/04* (2013.01); *E01B 25/30* (2013.01); *E01C 9/00* (2013.01); *B60M 7/00* (2013.01)

(58) Field of Classification Search
CPC .......... B60L 13/00; B60L 13/03; B60L 13/04; B60L 13/06; B60L 13/10; E01B 25/30; E01C 9/00
See application file for complete search history.

(56) References Cited

U.S. PATENT DOCUMENTS

| 1,121,533 A | 12/1914 | Obenaur |
| 5,287,026 A * | 2/1994 | Ogihara ................. B60L 13/10 104/281 |
| 2006/0016365 A1 | 1/2006 | Baldi et al. |

OTHER PUBLICATIONS

Halliday, D., et al., "Fundamentals of Physics Extended", John Wiley & Sons, Inc. 2011, ISBN-978-0-470-46908-8; Chapter 30—"Induction and Inductance".

* cited by examiner

*Primary Examiner* — Robert J McCarry, Jr.
(74) *Attorney, Agent, or Firm* — Morriss O'Bryant Compagni Cannon, PLLC.

(57) ABSTRACT

Embodiments are disclosed of a transportation pathway in the form of a road (10), which comprises a pavement sub-base material (12) located at surrounding ground (14), which has a layer which includes a conductive material. In one example, the layer is located on an uppermost surface (16) of the pavement sub-base (12). In the embodiment shown, the conductive material is in the form of a layer of asphalt (18) containing dispersed particulate conductive particles (20) in the form of graphene. A sufficient quantity of the conductive particles (20) is located a short depth from the uppermost road surface (22) of the asphalt layer (18), so that when the surface (22) is exposed to a primary magnetic field (28) generated by an external magnetic source positioned above the pathway, for example a powered hoverboard (24) or other vehicle, these conductive particles (20) create an induced magnetic field (26) which repels the primary magnetic field (28) being generated by the hoverboard (24). The opposing magnetic fields (26, 28) create a suspension of the hoverboard (24) above the road surface (22) known as magnetic levitation.

20 Claims, 12 Drawing Sheets

(51) Int. Cl.
*E01C 9/00* (2006.01)
*B60M 7/00* (2006.01)

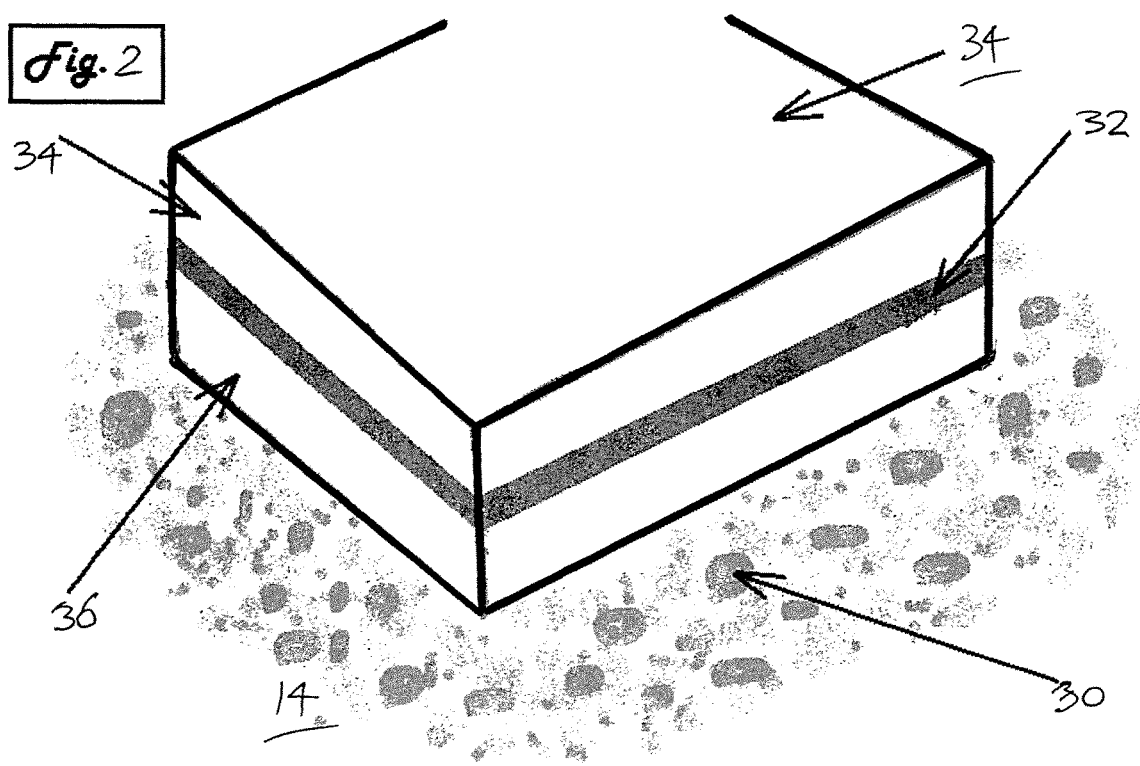
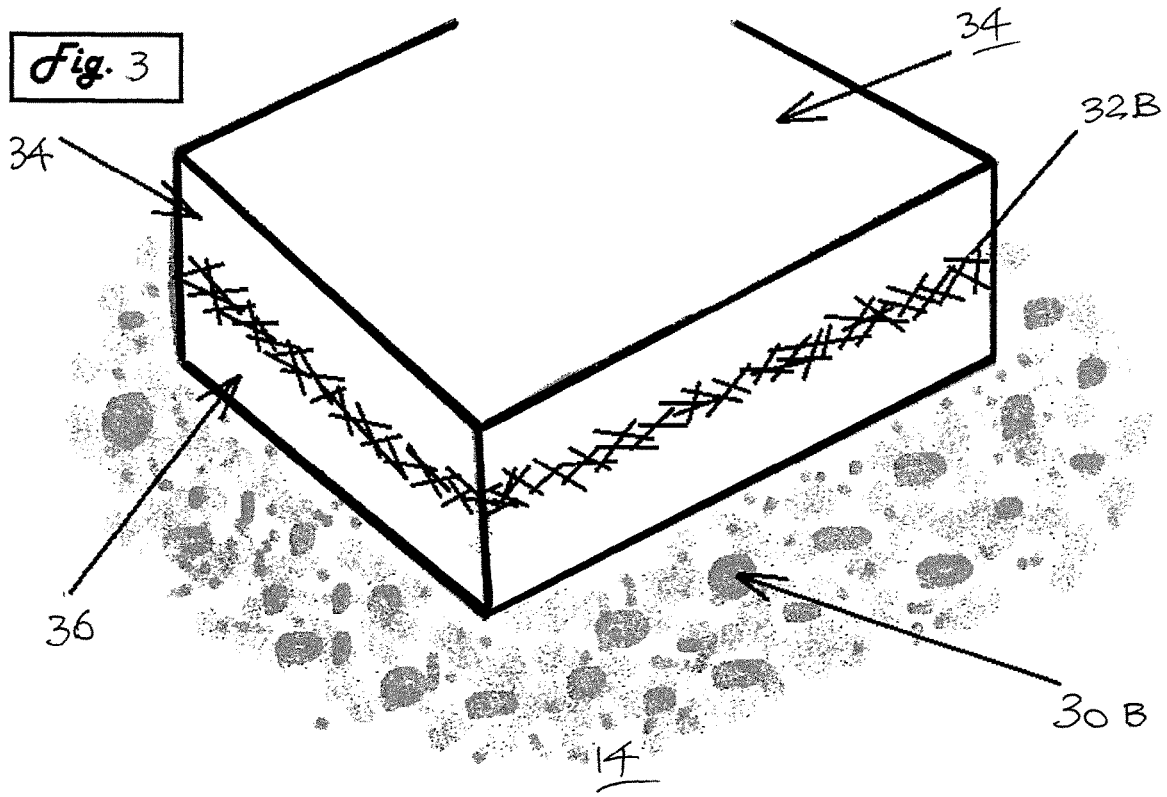

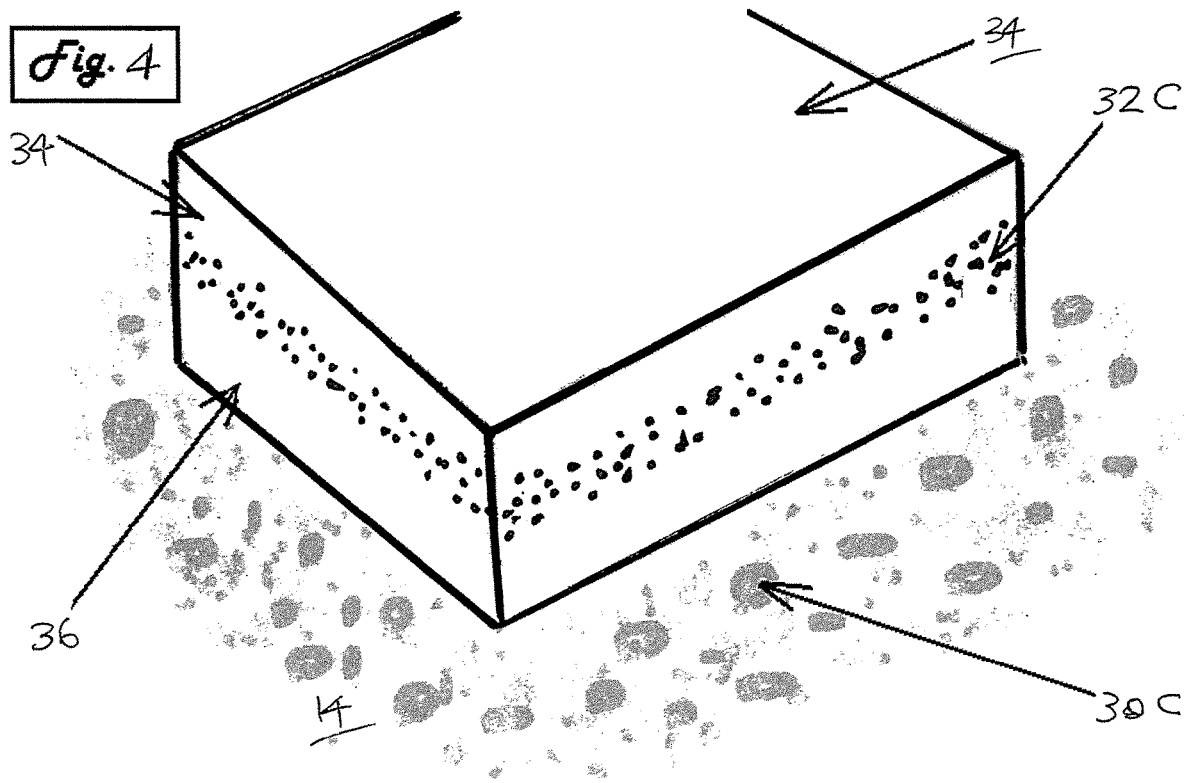
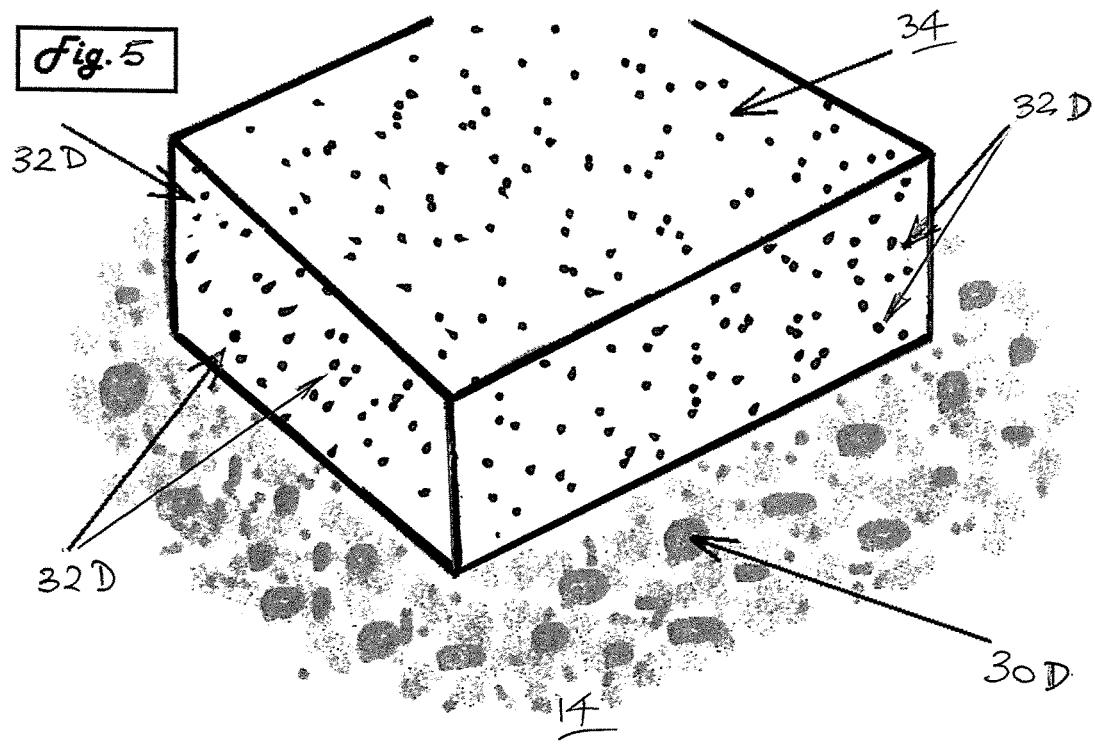

FIG 14

Road Construction (center)

Arrows pointing outward to:

- Seal Coat
- Sprays / Paints
- Geo-Tec Fabric (Geotextiles)
- Metal Sheets / Mesh
- 3D Plastic Moulds
- Pavers / Tiles
- Rubber / Metal Rings / Pads
- Concrete / Cement
- Pre Cast Concrete Road Pavement
- Added to bitumen / used as tack coat between layers
- Bitumen Spray Seal
- Road Stabilisation Process ADDITIVE / MODIFIER referred to in this patent relate to:
Superconductive
Electro conductive
Diamagnetic additives

** DELIVERY – in the future it is possible to mix the additive

Asphalt
*Mixed at plant
*In the paver
*During profile stage
*During rolling
*Shuttle buggy – additive can be placed while the asphalt is circulating inside the shuttle buggy (the temperature will be less at this point of entry)

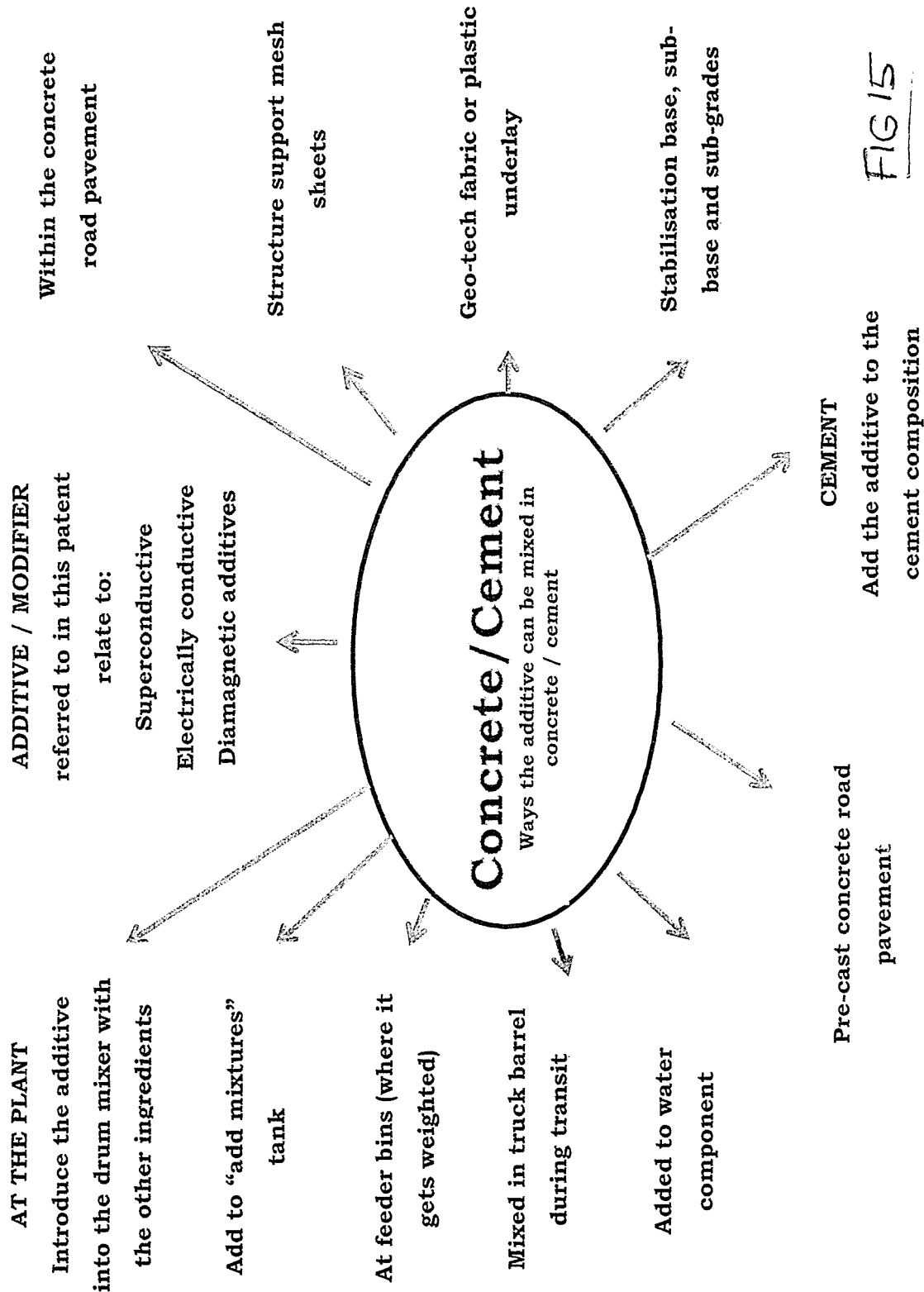

TRANSPORTATION PATHWAY AND METHOD OF FORMING SAME

TECHNICAL FIELD

This disclosure relates generally to a transportation pathway and a method for forming a transportation pathway. While the present disclosure is mainly concerned with electromagnetic levitation systems, and more particularly to the method of forming a transportation pathway over which users can move devices which employ electromagnetic levitation, it can also be applied to the method of forming any type of route or access thoroughfare along which an object or a device can travel in a friction free manner. This can encompass within its meaning a distance over which objects other than vehicles can be moved, for example in manufacturing processes to move a component of machinery along a prescribed arc of movement, or a route over which a stream of items can be moved in a selected direction, for example in a conveyer system.

BACKGROUND OF THE DISCLOSURE

A known magnetic repulsion effect is associated with generating a moving magnetic field near a conductive object. When a permanent magnet is moved near a conductive object, such as a metal object, eddy currents are established in the conductive object, which generate an opposing magnetic field (Lenz's Law). For example, in alternating current electric motors, current is supplied to coils which interact with magnets to move the magnets. The moving magnets interact with the coils to induce eddy currents in the coils which oppose the flow of current supplied to the coils.

Magnetic forces including magnetic lift are of interest in mechanical systems to potentially orientate and move objects relative to one another while limiting the physical contact between the objects. One method of generating magnetic lift involves an electromagnetic interaction between moving a magnetic field and induced eddy currents. In one example, a vehicle such as a hover engine can be caused to move at a distance above a transportation pathway, because the hover engine generates a primary magnetic field which induces a magnetic field in the conductive material of the pathway which produces eddy currents. The electromagnetic interaction between the device which induces the eddy currents and the induced eddy currents can be used to generate electromagnetic lift and various translational and rotational control forces.

The prior art document US2016033970A discloses a few examples of track configurations for directing a vehicle (such as a hover engine) over a conductive substrate, where the vehicle induces eddy currents in the conductive substrate. As is noted in that prior art document, the material properties of the conductive substrate affect the properties of the eddy currents which are able to be generated. When a conductive substrate is utilised in a track which is assembled in segments, depending on how the track is assembled, the conductive properties can change at the interface between the segments, and at the edges of the segments.

The prior art document US2016033970A discloses sheets of metal, or adjacent metal plates (for example made of copper), which can lay adjacent to one another, with or without being joined, or located in conductive contact with one another by a mechanical joint (e.g. a conductive strip with affixing paste). Other forms of track configuration disclosed include a solid sheet of metal with stamped-out holes made by removing material from the sheet, for example to form square recesses. If multiple overlaid sheets are used to generate sufficient repulsion, they need to be separated from one another by an insulating layer.

The use of metal sheet material, even with holes cut out from it, can be very expensive as a way of providing a transportation pathway for a repulsion lift vehicle such as a hover engine. It is admitted in the latter prior art document that a large amount of conductive material is required to form such a sheet substrate, which is costly as well as being complicated to evenly lay on surrounding ground. During its use, a large amount of heat can be generated in the conductive sheet, as a result of the resistance of a conductor to the flow of electrons induced by the exemplary hover engine, meaning that a track configuration which is formed of such metal sheets may require the addition of integrated cooling systems, such as cooling pipes located underneath the sheet to convey a fluid or a gas which in turn carries away heat generated in the conductive substrate. Under-surface cooling fins are also envisaged for this same purpose, via which a circulation system is connected to move air or water between the cooling fins to carry away heat from the cooling fins. Such additional requirements provide extra capital cost as well as logistical complications when constructing a transportation pathway for a repulsion lift vehicle.

There remains a need for a cost-effective transportation pathway configuration, as well as a simplified method for constructing such a transportation pathway, which incorporates the use of a conductive material configured in use to create an induced magnetic field when exposed to a primary magnetic field being generated by an external magnetic source. In such an arrangement, the induced magnetic field is used to repel the external magnetic source to create a "frictionless" operating environment for the external magnetic source to be moved relative to the transportation pathway (the term "frictionless" save for minor frictional forces such as air resistance and magnetic drag). It is advantageous for the transport pathway configuration of conductive material to be continuous, so as to facilitate movement therealong, as well as for the transport pathway to be of a type which can be laid easily in a manner which can cope with undulations in the surrounding ground. It is advantageous if the transportation pathway configuration can be arranged to deal with the heat which is generated by the conductive materials as a result of the generation of the induced magnetic field, without needing to provide extra cooling systems with costly capital outlays and operational expenditure.

SUMMARY

In a first aspect, embodiments are disclosed of a method of forming a transportation pathway, comprising the step of arranging a conductive material on an outermost surface of the pathway, or within the body of the pathway at an effective depth from said outermost surface, such that in use the conductive material creates an induced magnetic field when exposed to a primary magnetic field generated by an external magnetic source positioned above the pathway, so as to repel the external magnetic source.

When the term "transportation pathway" or "pathway" is used in this specification, this broadly refers to any type of route or access thoroughfare along which an object can travel. This can encompass within its meaning some conventional urban thoroughfares which comprise an asphalt or concrete paved uppermost in use surface, such as in a road, road base, path, footpath, pedestrian way, walkway, footway, sidewalk, runway, vehicle parking area, highway, motorway, freeway and the like. In such thoroughfares, the vehicle may be some sort of car or truck arranged to move people, animals or freight goods, for example. Other types of access thoroughfare within the scope of the present disclosure which are arranged for movement of a vehicle can include a rail pathway, a tube, slide or chute, for example at a fairground, and a skateboard park. In still other applications, a transportation pathway can include a distance over which objects other than vehicles can be moved, for example in manufacturing processes to move a component of machinery repeated along a prescribed arc of movement in a frictionless manner, such as a machine arm, or a piston. In still other applications, a transportation pathway can include a route over which a stream of items can be moved in a selected direction, for example in a mining process to move items in a frictionless manner, such as conveyer system.

In some embodiments, the conductive material is introduced on or within the pathway at the time of its formation. The conductive material can be added in a solid or liquid form to a new pathway so that it becomes an integral part of the pathway at the time of its building or construction. For example, the conductive material can be introduced at a depth in the pathway in any shape or form desired for the envisaged use of the pathway. In another example, the conductive material can be located at the outermost surface of the transportation pathway by using an external application method. In still other embodiments, the conductive material can be retrofitted to an existing formed pathway. For example, in the case of an asphalt or concrete paved road, a portion of the road can be excavated and then conductive material added in a particular arrangement to form the new pathway, so that it becomes part of the road, and the road then re-laid to incorporate the conductive material.

In some embodiments, the formation of the pathway is performed in a continuous laying process. The conductive material can be added in a solid or liquid form to a new pathway during the time that the pathway is being continuously laid by a machine technique, for example during the concreting or asphalt laying of a road for automobiles which involves a continuous pour of road layer(s) and levelling and compacting thereof. In still other embodiments involving a liquid conductive material, it can be continuously sprayed onto an uppermost surface of a pathway to form the desired transportation route required in later use of the pathway.

In some embodiments, the disposition of the conductive material on or within the pathway is arranged to influence motion of the external magnetic source along the pathway. During the time of forming the transportation pathway to include a conductive material, or during the retrofitting of an existing transportation pathway to incorporate a conductive material, a preselected or predetermined configuration of conductive material can be chosen depending on the desired end use application for the pathway. For example, the conductive material could be laid in one or more elongate strips along a ground surface road. In use along and above that pathway, a passenger-carrying vehicle which contains a primary magnetic field generator can be caused to move, and the conductive material influences the possible direction of movement of the vehicle because of the shape and/or orientation of conductive material within or at the ground surface road. In use, the vehicle can cause an induced magnetic field to be generated along the transportation pathway when the pathway is exposed to a primary magnetic field from the vehicle, the induced magnetic field which causes repulsion of the vehicle from the ground surface road. The arrangement of an elongate strip of conductive material forming part of the transportation pathway can therefore influence the motion of the vehicle along the length of the transportation pathway, so that the vehicle is capable of being moved in use along and above the elongate strip of conductive material.

In other examples, the conductive material can be disposed in other shapes and configurations, which are aimed to guide or to direct any object which is positioned above the pathway, where the object comprises a magnetic source which can generate a primary magnetic field. For example, the conductive material can be arranged in such pre-determined configurations and quantities to be able to influence motion of the external magnetic source in a moveable object or vehicle in ways which resist sideways motion, thus giving lateral stability, as well as to facilitate turning, acceleration and braking of the vehicle as it is being moved in use along and above the conductive material.

For example, a pre-determined higher concentration of discrete particulate materials, formed in the pathway structure along its opposing elongate side edge regions can increase the repulsion forces on the external magnetic source in the moving vehicle in those side edge regions. If the moving vehicle comes closer to those side edge regions, the increase in repulsive forces can have the effect of encouraging the vehicle back to a lower repulsion region in the centre of the pathway, and therefore to resist the tendency for it to slide off the pathway sides. In another example of this, by placing higher concentration of discrete particulate materials at one of the opposing side edge regions of an elongate pathway at an angled bend, but not on the other side edge region, this can increase the repulsion of the external magnetic source in the moving vehicle to resist the tendency to slide off the pathway on the major curve side of the pathway bend, and instead to tend to move toward the minor curve side of the pathway bend. The performance characteristics of the pathway structure itself can thus be pre-determined by its designers by making the addition of an extra quantity of dry, discrete conductive particulates per unit volume of the uppermost wear course, when forming the mixture for its use at an upper or outermost surface region of the pathway, for example at the or each side edge region(s).

Some other advantages of the use of a particulate form of a conductive material are that these particles can be readily applied to pathway upper surfaces where they are uneven in shape and surface texture, and even poured into potholes or other surface imperfections in an existing pathway, in situations where retrofitting of an existing, conventional transportation pathway (such as an asphalt road) is required, to incorporate a conductive material. In this way, such existing pathways can be more readily converted for use than excavating the whole road and inserting solid forms of conductive material.

Without wishing to be bound by theory, the inventor believes that the application of discrete particles of a conductive material can deliver a continuous or near-continuous layer of deposited conductive material, which when sealed onto the pathway upper surface and/or incorporated into the pathway itself, can function for the intended purpose as effectively as a continuous solid plate of a conductive material.

In some embodiments, the conductive material can be one or more of the group comprising: electrically conductive material, superconductive material, diamagnetic material. Diamagnetism, to some degree, is a property of all materials and determines responsiveness to a magnetic field. Substances that mostly display diamagnetic behaviour are termed diamagnetic materials, or diamagnets. All conductive materials exhibit an effective diamagnetism when they experience a changing magnetic field. The Lorentz force on electrons causes them to circulate around, forming eddy currents. The eddy currents then produce an induced magnetic field opposite the applied field, resisting the motion of the conductive material toward it. When the conductive material comprises electrically conductive material, this can also include semi conductive and conductive polymer materials.

In some embodiments, the conductive material is a pre-formed object which is arranged as a component of the pathway. Typically, such preformed objects are various shapes or configurations of solid conductive materials which can be laid down in rows, sheets or layers when a transportation pathway is being constructed. In one form of this, the pre-formed object is one or more of the group comprising metallic or partially metallic objects such as a rod, sheet, slab, bar, grid, mesh, fabric, net, woven product, belt, fibrous pad or mat. Some of these can also be metallic/polymer composites, for example a geo-synthetic fabric, or other related materials such as geotextiles, geogrids, geonets, geomembranes and geocomposites. These objects can be placed into a new pathway so that it becomes an integral part of the pathway at the time of its building or construction, and even located to be visible at the outermost surface of the transportation pathway, surrounded by and embedded in the other materials which form the structure of the pathway. In still other embodiments, the conductive material can be retrofitted to an existing formed pathway, as has been previously described herein.

In an alternative embodiment, the conductive material is a pre-formed object which is formed from a composite material by moulding. Stamping or moulding can be techniques used to form a desired shape of transportation pathway. In such cases the resulting object is three-dimensional in shape. The conductive material can be added to the composite feed, which can be a polymer or plastic moulding process, for example.

In an alternative embodiment, the conductive material is a pre-formed object which is formed by printing. Such a process of formation can include screen printing, raster scan printing, electrostatic printing, pad printing, raised ink printing or 3D printing. In all cases the resulting patterned layer may be at least somewhat three-dimensional in shape, and then can be incorporated as a part of the transportation pathway so that it becomes an integral part of the pathway at the time of its building or construction, surrounded by and embedded in the other materials which form the structure of the pathway. The advantage of the use of a pre-formed object formed by printing is that the conductive material can be given a unique shape which has been pre-determined to be suitable for a particular operational circumstance in the completed transportation pathway. In still other embodiments, the printed conductive material can be retrofitted to an existing formed pathway, as has been previously described herein.

In some embodiments, the conductive material is in particulate form when arranged as a component of the pathway. In one form of this, the particulate is one or more of the group comprising: powder, crystals, granules, flakes, fibres, microtubules, nano-materials. In some examples, the nano-materials include single or multi-walled nanotubes, nano-fibres, nano-crystals and nano-composites. In other examples, the particulates can be present as carbon fillers, graphene, graphene oxide, graphite oxide, layered graphene, reduced graphene oxide, graphite nanoplatelets, graphite nanosheets and graphite nanoflakes carbon black, carbon dust, silicones and oxide materials. The particulates can also be in the form of larger aggregated groups of particulates from one or more of the preceding options.

The conductive material can be added dry to form part of the transportation pathway when it is being formed, or can be blended in a liquid form to form a precursor component of the transportation pathway, for example mixed with a bitumen binder, asphalt cement, bitumen emulsion, liquid tar, or known types of polymer-modified asphalt cements or polymer-modified bitumen binders, for example Performance Graded asphalt cement/binders (PG), Stress Absorbing Membrane Interlayer (SAMI), Polymer Modified Bitumen (PMB), and Styrene Butadiene Styrene SBS).

The conductive material can also be added to a recycled asphalt product, for example by introduction into the recycling stage, prior to use as part of the construction of the transportation pathway. It is also possible to manufacture a preformed concrete element containing the dispersed particulate conductive material, with the concrete element able to be inserted as a layer into the structure of the transportation pathway in the form of a tile, sheet or slab element.

In some embodiments, the conductive material is in liquid form when arranged as a component of the pathway. In one form of this, the liquid can be one or more of the group comprising: emulsion, sprayed-on liquid, liquid coating, paint, gel. The conductive material can be a form of liquid itself which is sprayed on to form part of the transportation pathway, or can be blended in a liquid form to form a precursor component of the transportation pathway, for example coated onto the surface of a substrate material. Examples of the former can include a waterproofing membrane or other surface spray coating such as a two-coat bitumen spray seal where bitumen is the liquid which is applied by a spray sealing process. Examples of the latter can include bituminous material such as bitumen binder, bitumen emulsion, bitumen tack coating (located between pavement layers of a road), liquid tar, asphalt cement. The bituminous material can, for example, also include particulates of one or more of the group: graphene, graphene oxide, graphite oxide, layered graphene, reduced graphene oxide, graphite nanoplatelets, graphite nanosheets and graphite nanoflakes.

In any of the aforementioned embodiments of conductive material, more than one type can be utilised to provide a suitable quantity and distribution of conductive material component(s) over the length of a transportation pathway on an outermost surface thereof, or within the body of the pathway at an effective depth from said outermost surface, depending on the end use application, as long as the conductive material can create sufficient of an induced magnetic field when exposed to a primary magnetic field generated by an external magnetic source positioned above the pathway to achieve the desired purpose.

A number of different types and phases of conductive materials have been proposed, which need to be suitably positioned in relation to the other elements which form a transportation pathway using a range of suitable materials which bind the conductive materials in place. Such materials impart the mechanical strength of the pathway, and can confer properties of resilience, surface hardness, mechanical strength under load and cohesive bonding of the conductive materials thereinto. Example substances can include tar, bituminous material, asphalt, tarmac, tarmacadam, resins, concrete, and cements such as Portland, microbial and bio-cements. If a roadway for vehicles is the end-use application, there are usually a number of layers of earth, base material, gravel and pavement materials which are built up and which in use can support the embedded conductive material close to or at the uppermost face of the road. It is also possible to manufacture a preformed concrete element containing the conductive material to be inserted as a layer into the structure of the transportation pathway in the form of a tile, sheet or slab element.

In his goal of developing a transportation pathway which can be used for directing a repulsion lift vehicle such as a hover engine over a conductive substrate material, where the vehicle induces eddy currents in the conductive substrate in use, the present inventor has developed a novel method of forming such a pathway by arranging a conductive material on or within the pathway. He has done so in such a way which overcomes some of the disadvantages of the known prior art configurations of pathway which use metal sheets, which are overlaid on, or formed within, a substrate of the pathway. The novel method developed by the present inventor is a good option for reducing the amount of conductive material needed in a transportation pathway (when compared to using metal sheeting or panels), because the use of a sufficient quantity of discrete, dispersed particulates (for example, delivered either as particles included in an asphalt mix), or in a liquid form (as a spray-on coating of fine particles or colloidal particles), or in the form of a customised printed material (such as a 3D printed item), can offer the same repulsion performance characteristics as the metal sheets as a continuous, or near-continuous, layer of deposited conductive material, but at much reduced cost. In addition, the use of metal sheets necessitates laying a flat (or essentially planar) uppermost surface of pathway required for its use, which cannot easily be achieved when there are ground surface undulations. By using a substrate material which can be formed into a particular surface shape, and include the conductive materials within it, the inventor has created a more usable and adaptable pathway.

Furthermore, using some of the conductive substrates mentioned herein in the manner envisaged by the inventor, means that the large amount of heat which is usually generated by the use of metal sheets to form the conductive substrate of a transportation pathway for directing a repulsion lift vehicle, will be comparatively reduced. Instead the heat can be dissipated more widely from the chosen particulate, printed or composite conductive materials into the pathway substrate materials which are formed to surround them, or to be located underneath them, and ultimately into the surrounding ground. This arrangement obviates the need for any additional integrated cooling systems, such as cooling pipes, or under-surface cooling fins, being needed to carry away heat away from the transportation pathway, which will improve the integrity and thus longevity of the pathway structure, reduce the overall capital cost of producing the pathway, as well as reducing the expense and logistical complications encountered when constructing a transportation pathway for a repulsion lift vehicle.

In a second aspect, embodiments are disclosed of a transportation pathway, comprising a conductive material on an outermost surface of the pathway, or within the body of the pathway at an effective depth from said outermost surface, such that in use the conductive material creates an induced magnetic field when exposed to a primary magnetic field generated by an external magnetic source positioned above the pathway, so as to repel the external magnetic source.

In some embodiments, the disposition of the conductive material on or within the pathway is arranged to influence motion of the external magnetic source along the pathway.

In some embodiments, the conductive material is one or more of the group comprising: electrically conductive material, superconductive material, diamagnetic material.

In some embodiments, the conductive material is a preformed object which is a component of the pathway. In one form of this, the formed object is one or more of the group comprising metallic or partially metallic objects such as a rod, sheet, slab, bar, grid, mesh, fabric, net, woven product, belt, fibrous pad, mat, geosynthetic fabric.

In an alternative arrangement, the object is formed from a composite material by molding. In an alternative arrangement, the object is formed by printing.

In some embodiments, the conductive material is in particulate form when arranged as a component of the pathway. In one form of this, the particulate is one or more of the group comprising: powder, crystals, granules, flakes, fibres, microtubules, nano-materials or aggregates thereof. In some examples, the nano-materials include single or multi-walled nanotubes, nano-fibres, nano-crystals and nano-composites. In other examples, the particulates can be present as one or more of: carbon fillers, graphene, graphene oxide, graphite oxide, layered graphene, reduced graphene oxide, graphite nanoplatelets, graphite nanosheets and graphite nanoflakes, carbon dust, silicones and oxide materials.

In some embodiments, the conductive material is in liquid form when arranged as a component of the pathway. In one form of this, the liquid is one or more of the group comprising: emulsion, sprayed-on liquid, liquid coating, paint, gel. In one form of this, the liquid form is a bituminous material such as bitumen binder, asphalt cement, or bitumen emulsion. In some embodiments, the bituminous material includes particulates of one or more of the group: graphene, graphene oxide, graphite oxide, layered graphene, reduced graphene oxide, graphite nanoplatelets, graphite nanosheets and graphite nanoflakes.

In respect of the details of each of the embodiments of the second aspect, reference should be made to the specific details of each as outlined for the first aspect, which are also fully incorporated in the second aspect. In respect of the advantages of each of the embodiments of the second aspect, reference should be made to the advantages as outlined for the first aspect, which are also fully incorporated in the second aspect.

In a third aspect, embodiments are disclosed of a method of forming a transportation pathway which is arranged in use for guidance of the motion of a device, the method comprising the steps of: selecting a conductive material, being in a particulate form or in a liquid form when added as a component of the pathway; and arranging an amount of said conductive material on an outermost surface of the pathway, or within the body of the pathway at an effective depth from said outermost surface, and in a pre-determined disposition; such that in use the conductive material creates an induced magnetic field when exposed to a primary magnetic field generated by an external magnetic source positioned in the device when located above the pathway, so as to repel the external magnetic source and to magnetically levitate and guide the device.

The pre-determined disposition of the liquid or particulate conductive material on or within the pathway made during its formation is arranged to influence motion of the external magnetic source. During the time of forming the transportation pathway to include a conductive material, or during the retrofitting of an existing transportation pathway to incorporate a conductive material, a preselected or predetermined configuration of conductive material is chosen depending on the desired end use application for the pathway. In use along and above that pathway, a device which contains a primary magnetic field generator can be caused to move, and the conductive material influences the possible direction of movement of the device because of the shape and/or orientation of conductive material within or at the outermost pathway surface.

In some embodiments, the pre-determined disposition of the conductive material on or within the pathway is arranged to influence motion of the external magnetic source to remain located above the pathway. In use, the external magnetic source can cause an induced magnetic field to be generated at any point along the transportation pathway when the pathway is exposed to a primary magnetic field from the external magnetic source on the device, so that the induced magnetic field causes repulsion of the device (such as a passenger-carrying vehicle) away from the ground surface road.

In some embodiments, the pre-determined disposition of the conductive material on or within the pathway is arranged to guide the motion of the external magnetic source along the pathway. For example, a pre-determined arrangement of one or more elongate strips of conductive material forming part of the transportation pathway can provide guidance for the motion of the device along the length of the transportation pathway, if those strips are also aligned with the axis of the pathway, so that the device is capable of being moved in use along and above the elongate strip of conductive material.

In other examples, the conductive material can be disposed in other shapes and configurations, which are aimed to provide guidance for, or to direct, any device which is positioned above the pathway, where the device comprises a magnetic source which can generate a primary magnetic field. For example, the conductive material can be arranged in such pre-determined configurations and quantities to be able to influence motion of the external magnetic source in a moveable device in ways which resist sideways motion, thus giving lateral stability, as well as to facilitate turning, acceleration and braking of the device as it is being moved in use along and above the conductive material.

For example, a pre-determined placement of a liquid conductive material mixed into the pathway structure during its formation, or placed onto the upper surface thereof after formation (for example along its opposing elongate side edge regions) can increase the repulsion forces on the external magnetic source in the moving device (such as a vehicle) at those side edge regions. If the moving vehicle comes closer to those side edge regions, the increase in repulsive forces can have the effect of encouraging the vehicle back to a lower repulsion region in the centre of the pathway, and therefore to resist the tendency for it to slide off the pathway sides. The liquid conductive materials can firstly be spray-applied as a surface coating to the whole pathway surface, such as layers of coating or paint or spray emulsion which dry and seal onto the upper surface layer of the pathway. Then, to improve the performance characteristics of the pathway structure, its designers can add an extra quantity of sprayed-on or painted-on liquid forms of conductive particulates at certain regions of the outermost surface, for example at the or each pathway elongate side edge region(s), by applying a series of extra coatings over a number of stages of drying and reapplication.

Some of the advantages of the use of a liquid coating of a conductive material are that this can be readily applied to a pathway upper surface in situations where retrofitting of an existing, conventional transportation pathway (such as an asphalt road) is required, to incorporate a conductive material, without the need for excavation. The liquid form of the conductive material then dries and the colloidal conductive materials, or fine particles of conductive material (for example, ultrafine particles of graphene or of graphene oxide) suspended therein are deposited and dry to form a continuous or near-continuous conductive surface layer. In some embodiments, the formation of the pathway is performed in a continuous laying process for example the spray-application of a continuous strip of conductive material for drying.

Some other advantages of the use of a liquid coating of a conductive material are that this can be readily applied to pathway upper surfaces where they are uneven in shape and surface texture, and even poured into potholes or other surface imperfections in an existing pathway, in situations where retrofitting of an existing, conventional transportation pathway (such as an asphalt road) is required, to incorporate a conductive material.

Without wishing to be bound by theory, the inventor believes that the use of a liquid form coating of a conductive material can deliver a continuous or near-continuous layer of deposited fine or colloidal conductive material particles, when dried which can function for the intended purpose as effectively as a continuous solid plate of a conductive material.

In some embodiments, the steps of the method of the third aspect are otherwise as defined for the first or second aspects.

In respect of the details of each of the embodiments of the third aspect, reference should be made to the specific details of each as outlined for the first aspect, which are also fully incorporated in the third aspect. In respect of the advantages of each of the embodiments of the third aspect, reference should be made to the advantages as outlined for the first aspect, which are also fully incorporated in the third aspect.

In a fourth aspect, embodiments are disclosed of a system which is arranged in use for guidance of the motion of a device, the system comprising: a transportation pathway comprising a conductive material, as defined in the second aspect; and a device located above said pathway, an external magnetic source positioned therein; such that in use the conductive material creates an induced magnetic field when exposed to a primary magnetic field generated by the external magnetic source, so as to repel the external magnetic source and to magnetically levitate and guide the device.

In some embodiments, the disposition of the conductive material on or within the pathway is pre-determined to influence the motion of the external magnetic source and the device along the pathway.

In some embodiments, the disposition of the conductive material on or within the pathway is pre-determined to influence the motion of the external magnetic source and the device to remain located above the pathway.

In some embodiments, the device is a vehicle including one of a car, truck, bus or other vehicle for carrying passenger or freight.

In respect of the details of each of the embodiments of the fourth aspect, reference should be made to the specific details of each as outlined for the second aspect, which are also fully incorporated in the fourth aspect. In respect of the advantages of each of the embodiments of the fourth aspect, reference should be made to the advantages as outlined for the second aspect, which are also fully incorporated in the fourth aspect.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments which will be described:

FIG. 2 is schematic perspective view of an element of a transportation pathway, comprising a conductive material located in a sheet layer located below an uppermost surface of the pathway element, in accordance with a second embodiment of the present disclosure;

FIG. 3 is schematic perspective view of an element of a transportation pathway, comprising a conductive material present as a layer of woven mesh or net which is located below an uppermost surface of the pathway element, in accordance with a third embodiment of the present disclosure;

FIG. 4 is schematic perspective view of an element of a transportation pathway, comprising a conductive material present as a layer of particulates which is located below an uppermost surface of the pathway element, in accordance with a fourth embodiment of the present disclosure;

FIG. 5 is schematic perspective view of an element of a transportation pathway, comprising a conductive material present as a dispersion of particulates which is distributed throughout the pathway element including the uppermost surface, in accordance with a fifth embodiment of the present disclosure;

FIG. 14 is a pictorial representation of general locations where a conductive material can be added into the materials which are used for making a transportation pathway at the road construction stage, according to an embodiment of the present disclosure;

FIG. 15 is a pictorial representation of general locations where a conductive material can be added into the materials which are used for making a transportation pathway at the concrete and cement mixing or casting stage, according to an embodiment of the present disclosure;

DETAILED DESCRIPTION

Figure 1:
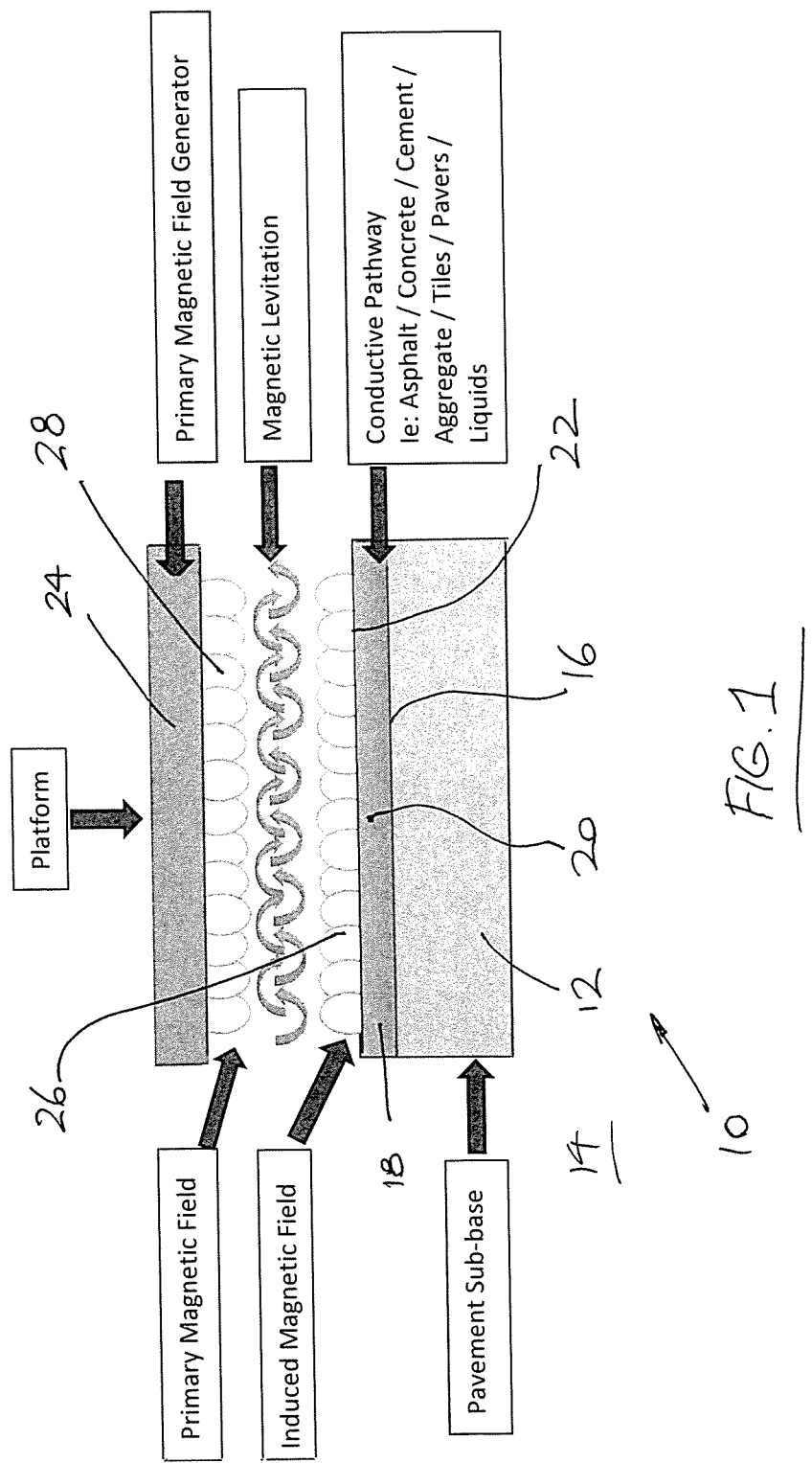
FIG. 1 is a schematic side view of a transportation pathway, comprising a conductive material located in a layer located on an uppermost surface of the pathway, and above a pavement sub-base layer in accordance with a first embodiment of the present disclosure; the Figure also schematically depicts the induced magnetic field emanating from that uppermost surface layer when exposed in use to a primary magnetic field generated by an external magnetic source positioned above the pathway.
Figures 16A, 16B:
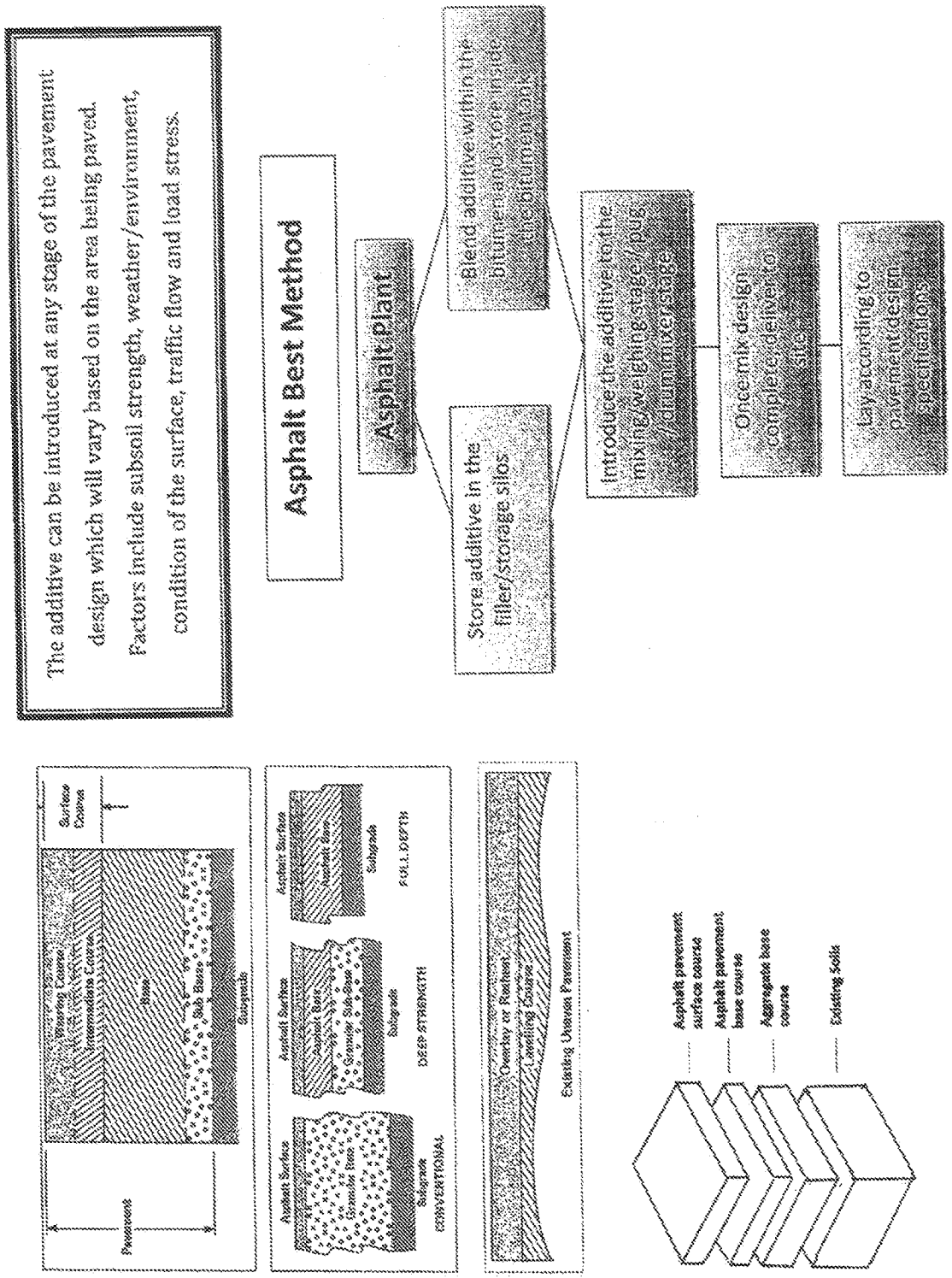
FIG. 16A is a pictorial representation of general locations where a conductive material can be added into the materials which are used for making a transportation pathway in various road pavement level, according to an embodiment of the present disclosure.
FIG. 16B is a pictorial representation of a method for making an asphalt containing a conductive material including general locations where the conductive material can be added into the asphalt which may be used for making a transportation pathway, according to an embodiment of the present disclosure.
Figure 17:
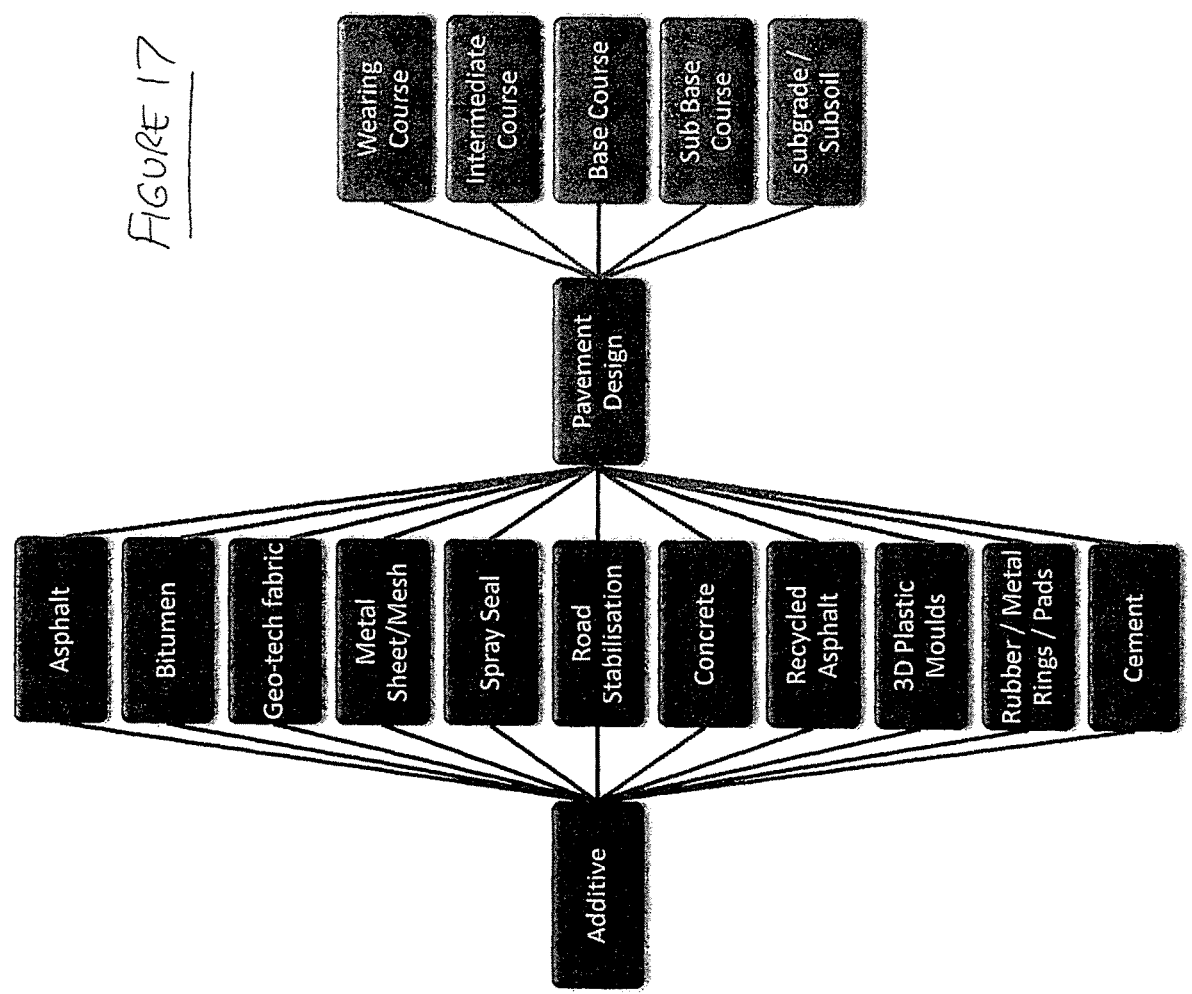
FIG. 17 is a pictorial representation of various options of where and how to add a conductive material into the materials which are used for making a transportation pathway, according to an embodiment of the present disclosure.

Referring to the drawings, and particularly to FIG. 1, an embodiment is disclosed of a transportation pathway in the form of a road 10, which comprises a pavement sub-base material 12 located at surrounding ground 14, which has a layer which includes a conductive material, in this example the layer being located on an uppermost surface 16 of the pavement sub-base 12. In the embodiment shown, the conductive material is in the form of a layer of asphalt 18 containing dispersed particulate conductive particles 20. However there are many other options for developing a conductive pathway, such as concrete, cement, aggregate, tiles, pavers and containing the conductive material, or even liquid conductive material which includes fine or colloidal conductive material, as will be described in the forthcoming examples. FIG. 17 summarises many of the possible ways which the conductive material may be added, and the many locations in which that conductive material can be arranged in the structure of a roadway for vehicles (a typical end-use application), in which there are usually a number of layers of gravel and pavement materials, The asphalt 18 imparts the properties of a conventional road surface in terms of hardness and mechanical strength under load, and the sub-base material 12 can typically comprise a number of layers of gravel and aggregates depending on the situation (as shown in FIG. 16A). There needs to be an effective (or sufficient) quantity of the conductive particles 20, located at an appropriate position within the asphalt layer 18, for example at an effective (or sufficient) depth from the uppermost road surface 22 of the asphalt layer 18, so that when the surface 22 is exposed to a primary magnetic field 28 generated by an external magnetic source positioned above the pathway, for example a powered hoverboard 24 or other vehicle, these conductive particles 20 create an induced magnetic field 26 which repels the primary magnetic field 28 being generated by the hoverboard 24. The opposing magnetic fields 26, 28 create an in use suspension of the hoverboard 24 above the road surface 22 known as magnetic levitation, indicated by the opposing directional arrows ML located between the primary magnetic field 28 and the induced magnetic field 26 in FIG. 1.

FIG. 16B is a pictorial representation of a method for making an asphalt containing a conductive material showing several locations where conductive material can be added— it may be stored in the filler/storage silos (16BA) or even blended into the bitumen (16BB) and stored inside the bitumen tank; or it can be introduced in at the mixing/weighing stage or the pug drum/mixer stage (16BC). Once the mixing is complete, the asphalt can be delivered to site (16BD) and then laid according to the pavement design specifications (16BE).

Figure 9:
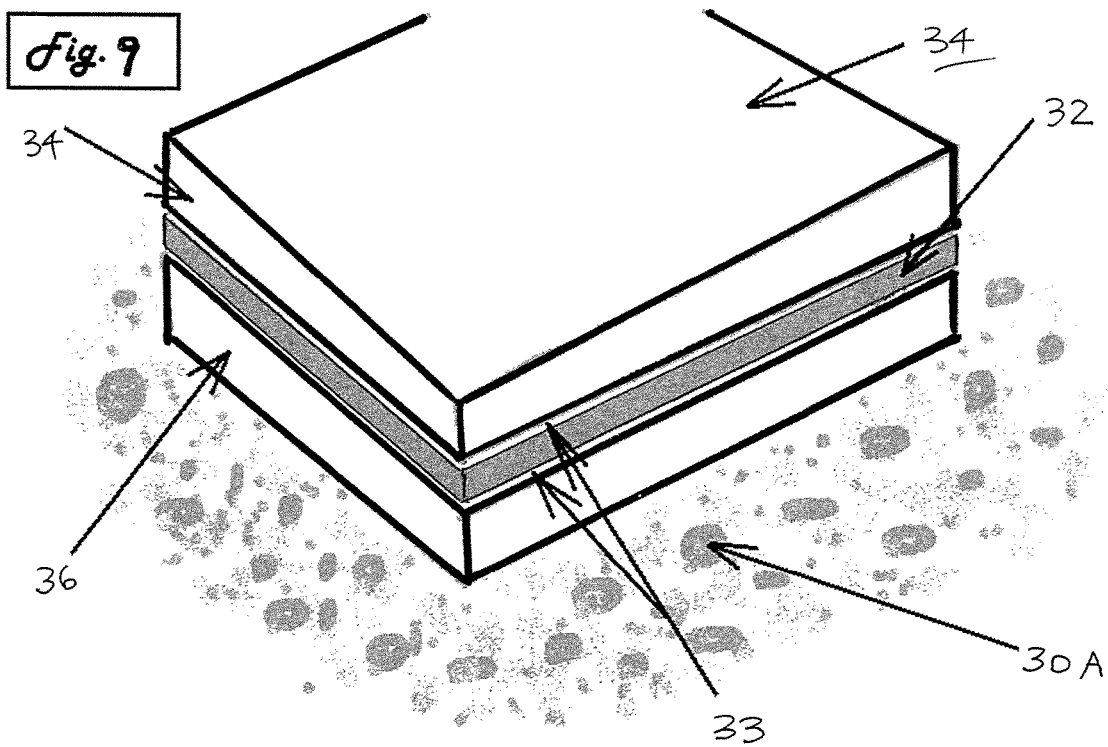
FIG. 9 is schematic perspective view of an element of a transportation pathway, comprising a conductive material present as a solid sheet layer which is located below an uppermost top layer of the pathway, in accordance with a ninth embodiment of the present disclosure.

Referring now to FIGS. 2 to 6 and FIG. 9, these depict a preformed concrete element or module in the form of a tile or slab 30 containing the conductive material to be inserted as a layer into the structure of a transportation pathway, such as a road. Although illustrated as a square module, these can be manufactured in any desired shape that is suitable for the end use application, such as rectangles, hexagons, and so on. In each embodiment, like functioning parts have been given an equivalent part numbers. FIG. 2 shows the conductive material formed as a flat sheet layer 32, for example a pre-formed sheet of copper or other conductive material, which is sandwiched between an uppermost surface layer 34 of the tile 30 and a lowermost foundation or base layer 36, and in which the surface layer 34 and the base layer 36 are made of the same materials. In other embodiments, these layers can be made of dissimilar materials. There may even be multiple layers of conductive material, vertically spaced apart from one another by the concrete or asphalt material which forms the bulk of the structure of the tile. As shown in FIG. 9, there may even be a gap or space 33 on either side of the layer of conductive material 32, such that it is vertically separate from the concrete or asphalt material layers 34, 36 which form the bulk of the structure of the tile 30A (in other words the internal layers comprising a tile may be laid separately on top of each other at the time of installation, and may include air gaps). Concrete is just an illustrative material, and such tiles can be made of many other bulk materials which can confer mechanical strength to the transportation pathway, along with resilience, surface hardness, mechanical strength under load and cohesive bonding of the conductive materials thereinto.

For installation in a road, the exemplary tile 30 is manufactured and is then moved to the road construction (or retrofitting) location, where a number of such tiles are aligned adjacent to one another along surrounding ground, and leveled out at their uppermost surface layer 34, thereby to form an elongate transportation pathway which presents a smooth uppermost surface to a moveable external magnetic source, such as in a vehicle. In the case of an existing asphalt or concrete paved road, a portion of the road can be excavated and then a row or rows of the exemplary tiles 30 can be laid out to form the new pathway, so that these becomes part of the road and are affixed into place. As shown in FIG. 16A, if a roadway for vehicles is the end-use application, there are usually a number of layers of gravel and pavement materials, (for example comprising earth or soils E, aggregated base course material ABC, asphalt pavement base course PBC, asphalt pavement surface course PSC) which are already built up, and which can support an inserted layer of the tiles 30 close to or at the uppermost face of the road. Preliminary calculations have shown that a typical depth position for the conductive material to extend into the road in a direction away from the upper surface face is 100 millimetres or less, for it to remain an effective means to induce repulsion of a device with an electromagnetic source which is located above the road surface. This sort of depth is shallower than the usual depth at which structural reinforcement is located in conventional concrete or asphalt roadways.

FIG. 3 depicts a tile 30B which is similar in all respects to the embodiment of the tile 30 shown in FIG. 2, except that the conductive material is present as a layer of woven mesh or net 32B. FIG. 4 depicts a tile 30C which is similar in all respects to the embodiment of the tiles shown in FIGS. 2 and 3, except that the conductive material is present as a layer of particulate flakes 32C which have then been formed and bonded into a component layer of the tile 30 during its manufacturing process. It is also possible to manufacture a preformed concrete tile 30D containing a dispersed particulate conductive material 32D, as shown in FIG. 5, which is distributed randomly throughout the entire formed tile 30D, up to and including the uppermost surface layer 34. In each case described hereinabove, the tile 30 is then able to be inserted as a layer into the structure of the transportation pathway such as a road.

Figure 6:
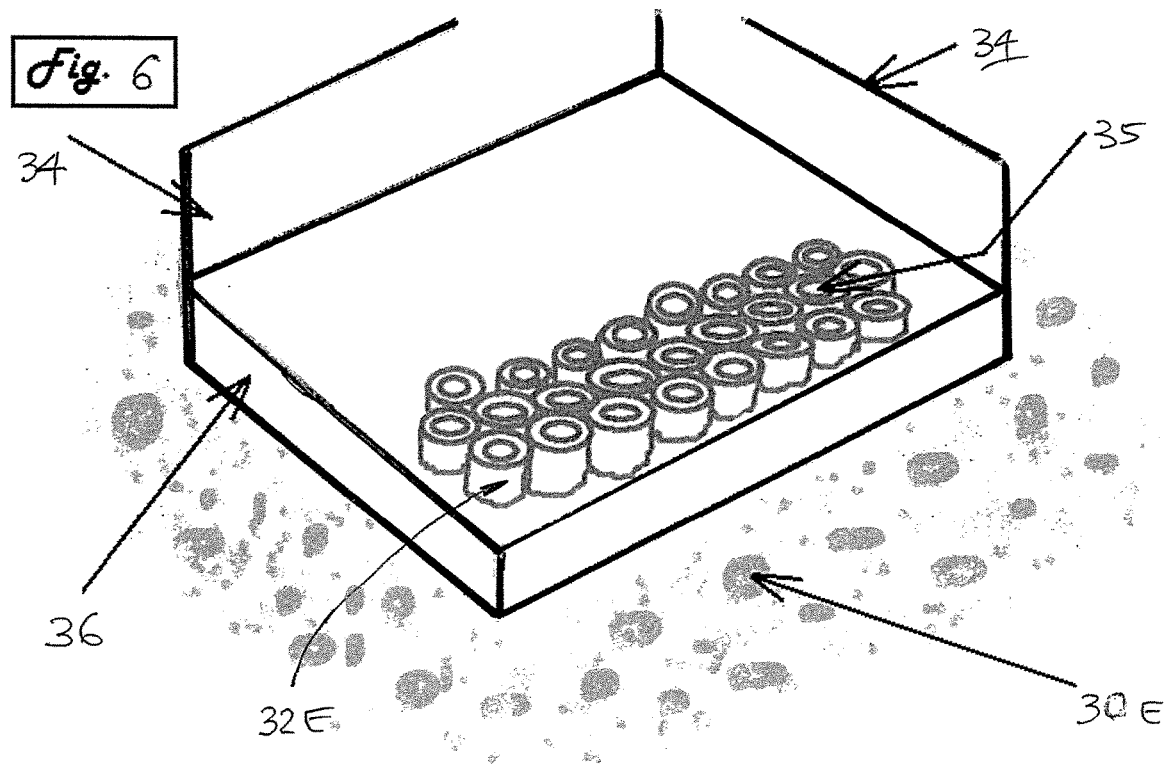
FIG. 6 is schematic, partial section, perspective view of an element of a transportation pathway, comprising an array of aligned, pre-formed tubes which are made of a composite material produced in by a prior moulding process and which incorporate the conductive material, the array forming a layer which is located below an uppermost surface of the pathway element, in accordance with a sixth embodiment of the present disclosure.

FIG. 6 is similar in all respects to the embodiment of tile 30 shown in FIG. 2, except that the conductive material is present as a pre-formed object, in this instance a layer of short tubes 35, each tube axis aligned vertically with one another and formed in a honeycomb-like array, which is arranged in a layer 32E. Such pre-formed tubes are made of a composite material produced in by a prior moulding process which incorporates the conductive material. The layer 32E is then incorporated into a component of the tile 30E during its manufacturing process. In FIG. 6, the tile 30E is shown as being partially constructed only, and the array of tubes 35 are positioned atop the lowermost portion or base layer 36, prior to the formation of an uppermost surface layer 34 of the tile 30E, which seals above and around the array of tubes 35, so as to complete them into the tile 30E structure.

Figure 7:
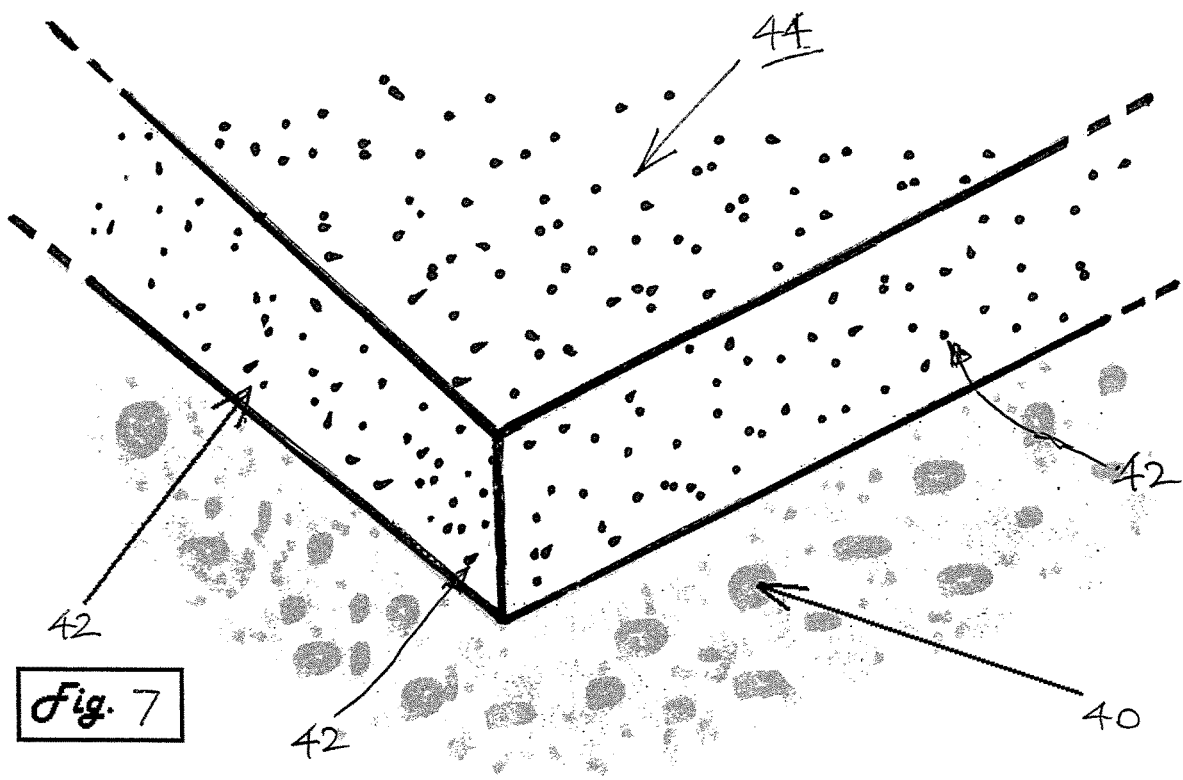
FIG. 7 is schematic perspective view of a transportation pathway, comprising a conductive material present as a dispersion of particulates which is distributed throughout the body of the pathway including at the uppermost surface, and where the pathway is laid in a continuous fashion, in accordance with a seventh embodiment of the present disclosure.
Figure 8:
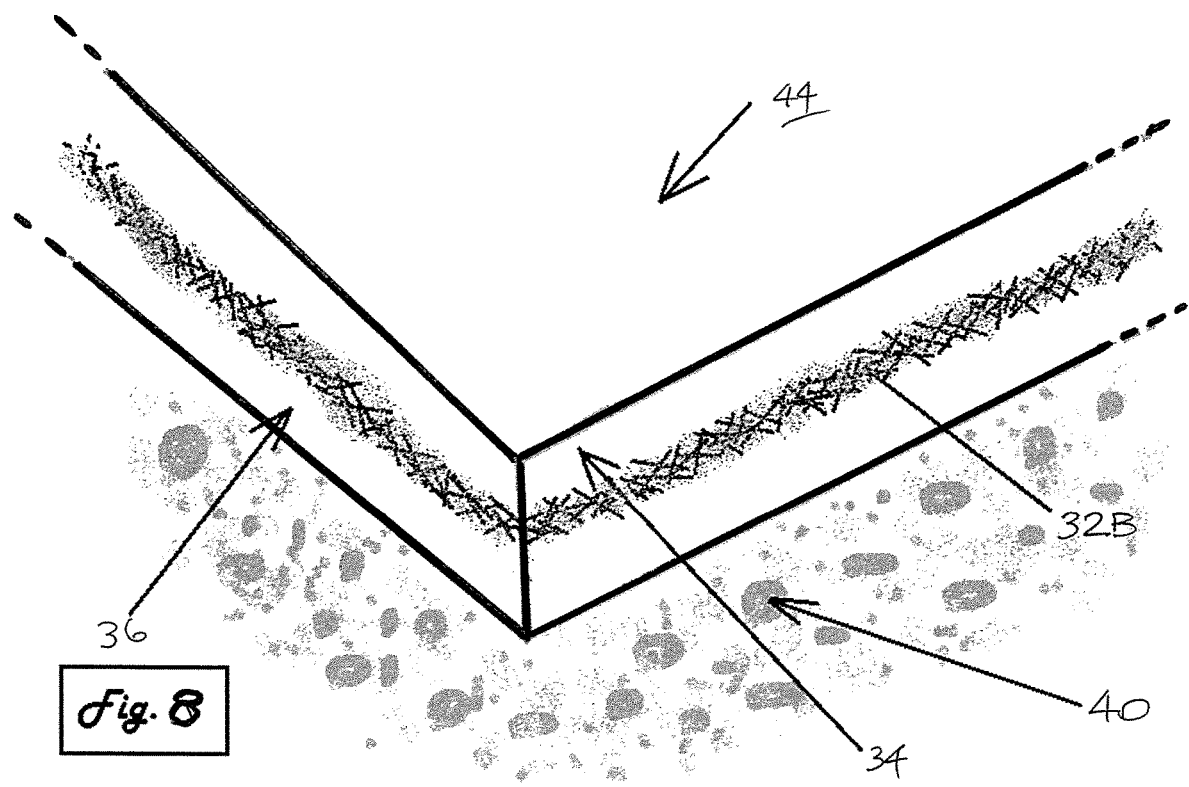
FIG. 8 is schematic perspective view of a transportation pathway, comprising a conductive material present as a layer of woven mesh or net which is located below an uppermost surface of the pathway, and where the pathway is laid in a continuous fashion, in accordance with an eighth embodiment of the present disclosure.
Figure 11:
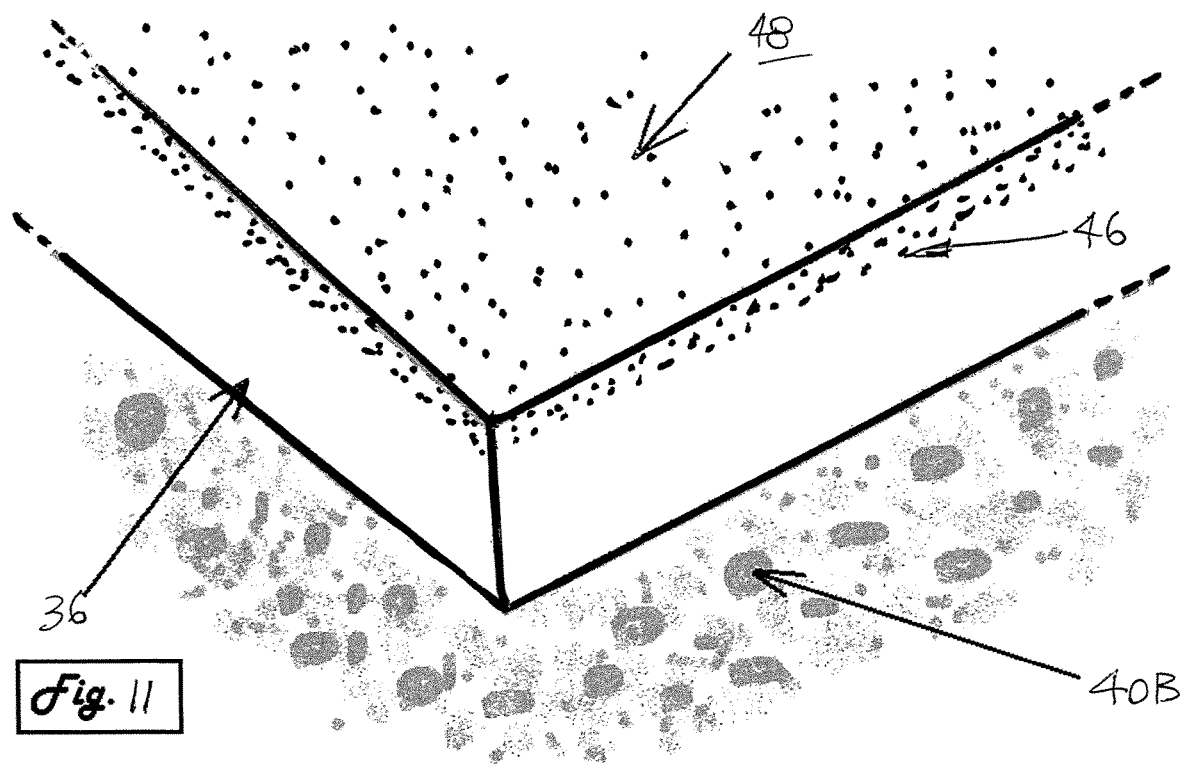
FIG. 11 is schematic perspective view of a transportation pathway, comprising a conductive material present as a dispersion of particulates distributed in a layer which forms an uppermost surface of the pathway, the pathway being laid in a continuous fashion, in accordance with an eleventh embodiment of the present disclosure.

Referring now to FIGS. 7, 8 and 11, these depict a transportation pathway in the form of an asphalt road 40 which has been laid in a continuous fashion, by conventional road building techniques, and containing the conductive material placed within the structure of the road 40.

Figure 13:
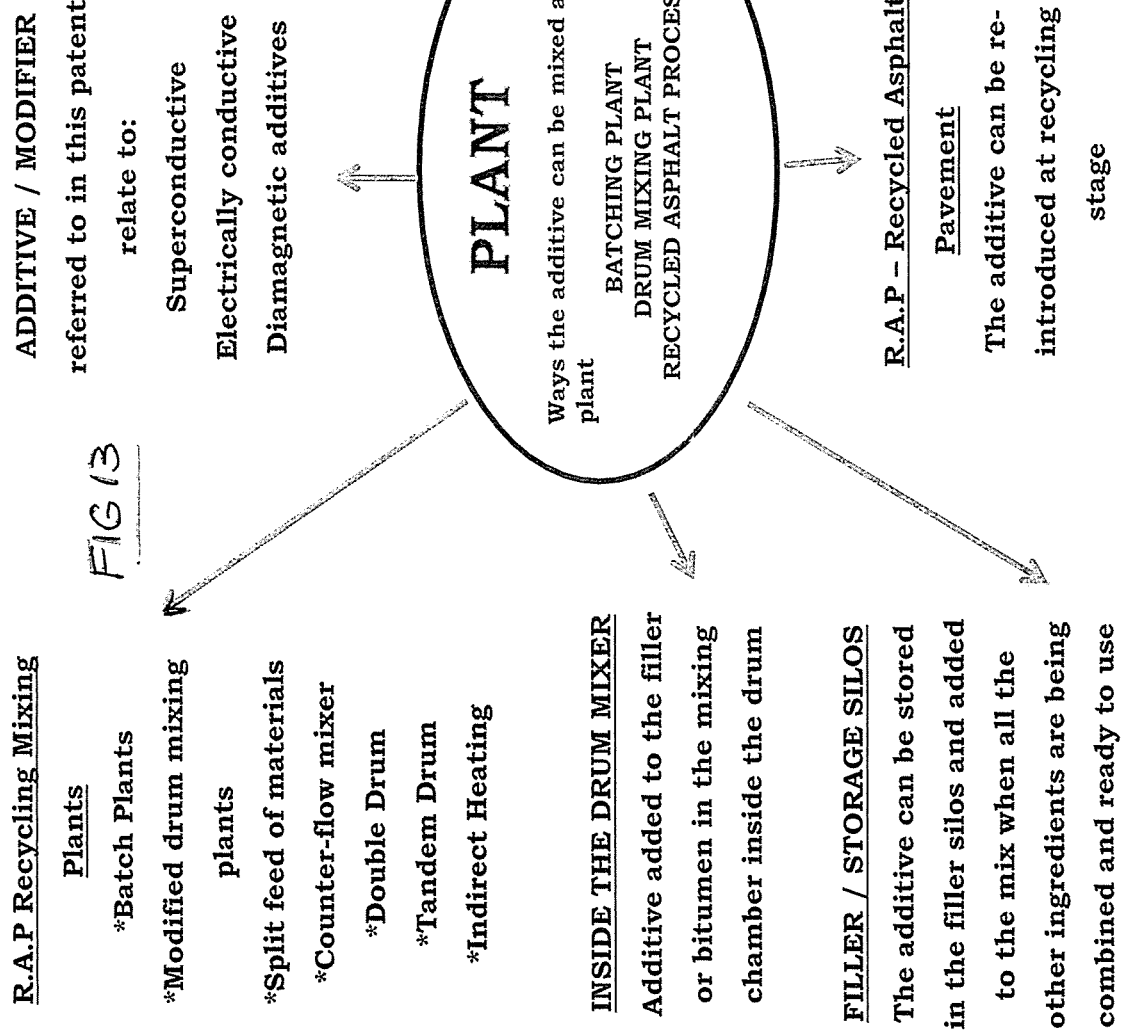
FIG. 13 is a pictorial representation of general locations where a conductive material can be added into the materials which are used for making a transportation pathway at the mixing plant stage, according to an embodiment of the present disclosure.

In FIG. 7 the conductive material is present as a dispersion of particulates 42 which is distributed throughout the entire body of the pathway including and up to the uppermost surface 44. Such particulates 42 of conductive material can be added at the asphalt plant stage, as described in FIG. 13, for example to be mixed with the bitumen binder/asphalt cement or even dry-mixed with the asphalt ingredients. In this FIG. 13, the conductive material can be superconductive, electrically conductive or diamagnetic. It can be added in the batching plant, the drum mixing plant and even in a recycled asphalt process plant (13F). When added in the mixing plant, this can be done by batching, use of a modified drum mixer, added to split feeds of material, added to a counterflow mixer, a double drum or a tandem drum (13A). Inside a drum mixer, the conductive material additive can be added to the filler or bitumen inside the mixing chamber in the drum (13B). It can be stored in a storage silo and only added into the mix when all of the other ingredients have been combined and are ready to be used (13C). It can be added into the aggregate feeding system at the time the aggregate is being placed in the bins (13G). If the conductive material is added to the bitumen itself, it can be added to whichever grade of bitumen is developed by the supplier (13D), or later mixed by the operator at the asphalt plant, for instance into the bitumen storage tank (13F) or into the bitumen emulsion (13E).

In the case of a concrete road, particulates of conductive material can be added at the concrete and cement mixing stage batching plant, as described in FIG. 15, for example to be dry-mixed with the rest of the cement mix ingredients. The alternate locations include the conductive material additive being included in the drum mixer with other ingredients (15A), into the admixture tank (15B), in the feeder/weighing bins (15C), mixed in a rotating mixer truck barrel during transit (15D), or even added with the addition of water (15E). The conductive material additive can be included into the concrete roadway in many ways, for example within the concrete road pavement itself (15F), as a structural item such as support mesh sheets (15G), as a Geotech fabric or plastic underlay (15H), or into the subgrade, sub-base and stabilisation base layers (15J) of the ground under the road. Finally, the conductive material can be added into the cement mixture itself (15K) or even into the cement mixture which is pre-formed into pre-cast concrete road pavement blocks (15L).

Figure 12:
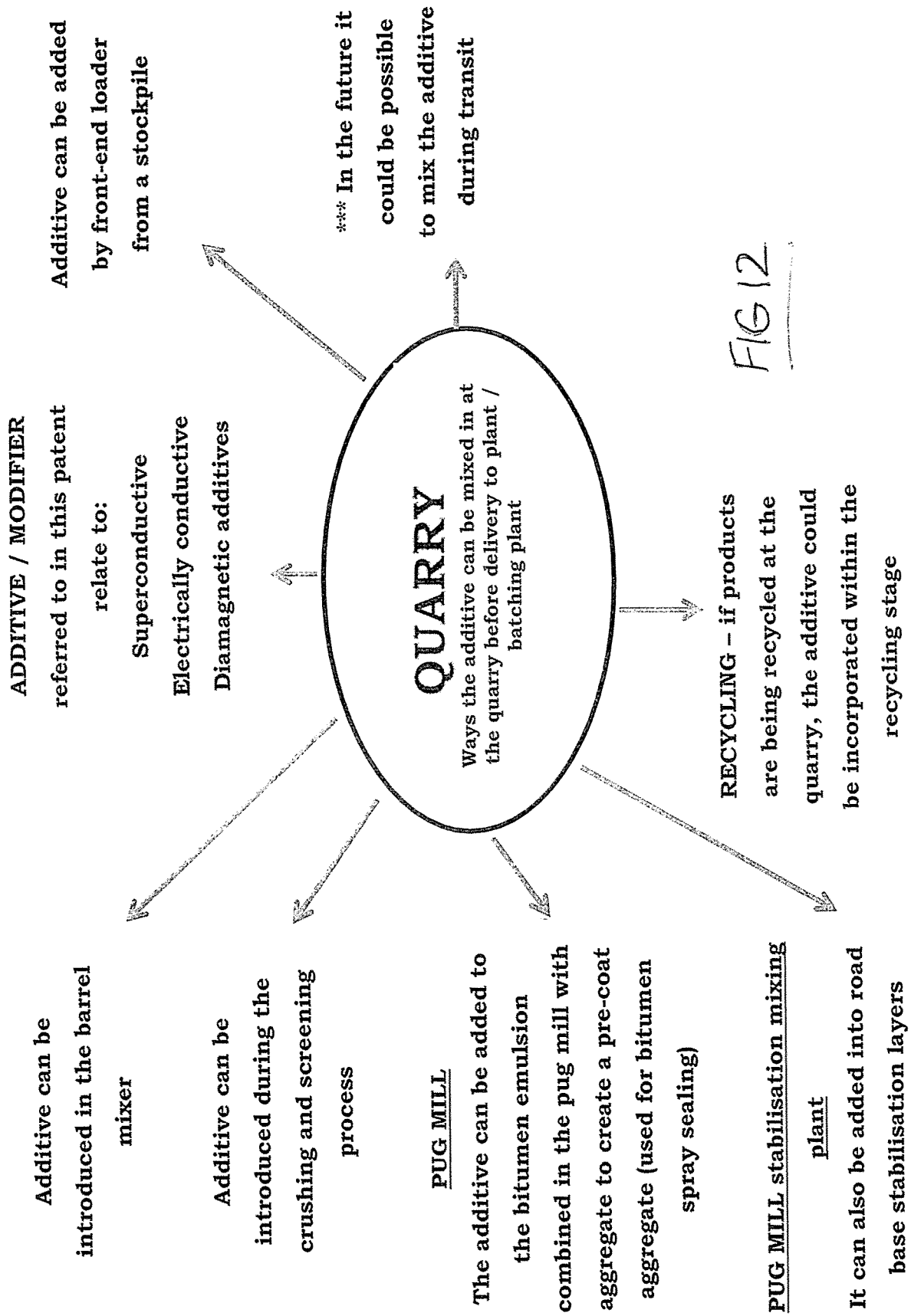
FIG. 12 is a pictorial representation of general locations where a conductive material can be added into the materials which are used for making a transportation pathway at the quarry stage, according to an embodiment of the present disclosure.

In either concrete or asphalt roads, particles of conductive material can also be added into one of the precursor components of the feed material, at the quarry and aggregate blending stage, and before delivery to the asphalt plant, as described in FIG. 12. The conductive material can be added into the barrel mixer (12A), at the crushing and screening process (12B), into the pug mill (for example into the bitumen emulsion and combined in the pug mill with aggregate to create a pre-coat aggregate (used for bitumen spray sealing, 12C), or into the pug mill stabilisation mixing plant (12D). The conductive material additive can even be added by use of a front-end loader from a stockpile (12E). It may also be possible to add the material during transit, for example be mixed in a rotating barrel mixing truck (12F).

In FIG. 8, the conductive material is present as a layer of woven mesh or net 32B which is located below an uppermost surface 44 of the road 40. The layer of woven mesh 32B can be laid down in sheets or from a roll dispenser on top of the lowermost foundation or base layer 36, at the time of pouring the asphalt, as described in FIG. 14 for example, and similarly in the case of a concrete road, as described in FIG. 15. Subsequent to the woven mesh layer 32B being positioned, a surface layer 34 can be laid down thereover in a continuous manner using conventional pouring means, and then the road surface is finished off.

In FIG. 11, the conductive material is present as a dispersion of particulates distributed in a layer 46 which forms an uppermost surface 48 of the road 40B on top of the lowermost foundation or base layer 36. Such a layer can be laid down in a continuous fashion, for example using a bitumen spray seal process, as described in FIG. 14. This is an example of where conductive material is located at the outermost surface of the road using an external application method, and even retrofitted to an existing formed road to adapt it for later use during motion of vehicles under magnetic levitation.

Figure 10:
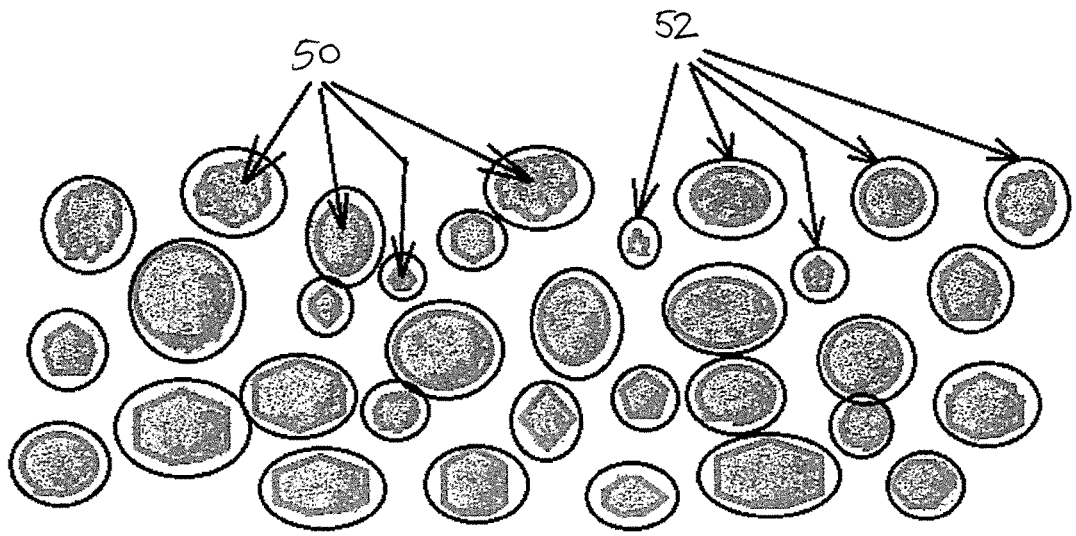
FIG. 10 is schematic perspective view of particulates which are pre-coated with a liquid layer of conductive materials which can be incorporated as part of a transportation pathway, in accordance with a tenth embodiment of the present disclosure.

In FIG. 10, a cross-section is shown of relatively coarse particulates 50 used for construction of a road which are coated with a liquid layer 52 containing very fine conductive materials, where the fine conductive materials are introduced in a bitumen emulsion for pre-coating onto the coarse particulates 50. The particulates 50 which are coated with the conductive material in the bitumen emulsion can then be used to construct a road surface by using a bitumen spray sealing process, as described in FIG. 14.

To summarise, for road construction, particulates of conductive material can be added in many locations as described in FIG. 14, for example to be added as an ingredient of the road stabilisation process (14A), as part of the asphalt (for example placed into the asphalt at various stages of mixing in the plant, during the road construction phase, during rolling of the asphalt onto the road or even in the circulating asphalt shuttle buggy) (14B), as a bitumen surface spray seal (14C), added to the bitumen as a tack coat between layers (14D), as a seal coating on the road surface (14E), as a spray paint coating (14F), as a geotextile (Geotech fabric) (14G), as metal sheets or mesh (14H), as 3D printed plastic moulds (14J), as a component of finished pavers and tiles (14K), as a component of rubber or metal rings and pads (14L), as an ingredient of the concrete or cement (14M), or even as an ingredient if a pre-cast concrete road pavement block (14N).

A hoverboard is just one example of an electromechanical device which can generate forces, such as lift, via an interaction between a moving magnetic field source and induced eddy currents. The hover engines generate a magnetic field which changes as function of time. The time varying magnetic field can interact with the conductive material in the road to form eddy currents. The eddy currents and their associated magnetic fields and the magnetic fields from the hover engine can generate forces, such as a lifting force or a propulsive force. The inventor believes that the provision of creative designs of transportation pathways to provide good magnetic repulsion is critical to the success and efficient operation of any such moveable electromechanical devices for transportation. During the time of forming the transportation pathway to include a conductive material, or during the retrofitting of an existing transportation pathway to incorporate a conductive material, a pre-selected or predetermined configuration of conductive material can be chosen depending on the desired end use application for the pathway.

The inventor has developed a method of forming an entirely new transportation pathway, or by retrofitting an existing transportation pathway, which can cost effectively utilise the effect of induced magnetic field to create a "frictionless" operating environment for an external magnetic source to be moved relative to the transportation pathway. The new transport pathway of conductive material is flexible in terms of its design—it is readily configurable into a pre-determined design, to facilitate and to guide the movement of a vehicle or other device which carries the magnetic source. This is especially the case if particulate conductive material, printed conductive material or liquid (which contains ultrafine or colloidal) conductive material is used as part of the configuration and design process. The use of such particulate, printed or liquid conductive materials allows easy customisation of the transportation pathway design, and also allows the pathway to be retrofitted onto an existing conventional transport pathway, even if it has undulations in the surrounding ground.

The inventor has developed a method of forming a transportation pathway, by arranging a conductive material on an outermost surface of the pathway, or within the body of the pathway at an effective depth from said outermost surface, such that in use the conductive material creates an induced magnetic field when exposed to a primary magnetic field generated by an external magnetic source positioned above the pathway, having at least some of following beneficial features and outcomes:

- The use of guided travel path for a vehicle along defined transportation pathways can provide better control of driver behaviour such as loss of traction, misinterpretation of road conditions and driver fatigue, which in turn can reduce the number of road accidents, save lives, reduce property and freight damage, reduce insurance premiums;
- The use of guided travel path for a vehicle along defined transportation pathways will also allow the rate of movement of the vehicle to increase, potentially leading to faster travel times, which can in turn increase productivity, reduce driver fatigue and give faster delivery and emergency response times, especially in remote areas;
- The use of guided travel path for vehicles along defined transportation pathways means that if the speed of the vehicles is controlled and essentially the same, this can improve sequencing of traffic flow, allowing a safer interaction between vehicles on the pathway, thus reducing traffic congestion;
- A reduction in the need for tyres, oil and fuel can also reduce carbon emissions, pollution and waste;
- The cost of running a commercial freight transportation business may be reduced because of the decreases in both fuel and tyre expenses, along with less downtime and faster turn-around time;
- There will be less need to transport tyres and fuel around a nation; and
- Road maintenance costs can be reduced because of the frictionless movement of a vehicle along the transportation pathway.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realise yet other embodiments. Further, each independent feature or component of any given assembly may constitute an additional embodiment.

The invention claimed is:

1. A method of forming a transportation pathway, comprising the step of arranging a quantity of a conductive material on an outermost surface of the pathway, or within the body of the pathway at a depth from said outermost surface, such that, in use, when exposed to a primary magnetic field generated by an external magnetic source positioned above the pathway, the quantity of said conductive material used is sufficient to create an induced magnetic field which repels the magnetic field of said external magnetic source, said induced magnetic field being sufficient to create an in use suspension or levitation of the external magnetic source away from, and above, the outermost surface of the pathway, and wherein the conductive material is one or more of the group comprising: electrically conductive material, superconductive material, diamagnetic material, any of which also include semi conductive and conductive polymer materials.

2. The method as claimed in claim 1, wherein the conductive material is introduced on or within the pathway at the time of its formation.

3. The method as claimed in claim 1, wherein the formation of the pathway is performed in a continuous laying process.

4. The method as claimed in claim 1, wherein the disposition of the conductive material on or within the pathway is arranged to influence motion of the external magnetic source along the pathway.

5. A method of forming a transportation pathway, comprising the step of arranging a quantity of a conductive material on an outermost surface of the pathway, or within the body of the pathway at a depth from said outermost surface, such that in use, when exposed to a primary magnetic field generated by an external magnetic source positioned above the pathway, the quantity of said conductive material used is sufficient to create an induced magnetic field which repels the magnetic field of said external magnetic source, said induced magnetic field being sufficient to create an in use suspension or levitation of the external magnetic source away from, and above, the outermost surface of the pathway, and wherein the conductive material is in particulate form when arranged as a component of the pathway.

6. The method as claimed in claim 5, wherein the particulate form is one or more of the group comprising:

powder, crystals, granules, flakes, fibres, microtubules, nano-materials, or aggregates thereof, and wherein the particulate material includes one or more of the group: graphene, graphene oxide, graphite oxide, layered graphene, reduced graphene oxide, graphite nanoplatelets, graphite nanosheets and graphite nanoflakes.

7. A method of forming a transportation pathway, comprising the step of arranging a quantity of a conductive material on an outermost surface of the pathway, or within the body of the pathway at a depth from said outermost surface,
  such that in use, when exposed to a primary magnetic field generated by an external magnetic source positioned above the pathway, the quantity of said conductive material used is sufficient to create an induced magnetic field which repels the magnetic field of said external magnetic source,
  said induced magnetic field being sufficient to create an in use suspension or levitation of the external magnetic source away from, and above, the outermost surface of the pathway, and
  wherein the conductive material is in liquid form when arranged as a component of the pathway.

8. The method as claimed in claim 7, wherein the liquid form is one or more of the group comprising: emulsion, sprayed-on liquid, liquid coating, paint, gel.

9. The method as claimed in claim 7, wherein the liquid form is a bituminous material such as bitumen binder, asphalt cement, bitumen emulsion, and wherein the bituminous material includes particulates of one or more of the group: graphene, graphene oxide, graphite oxide, layered graphene, reduced graphene oxide, graphite nanoplatelets, graphite nanosheets and graphite nanoflakes.

10. A transportation pathway, comprising a quantity of a conductive material on an outermost surface of the pathway, or within the body of the pathway at a depth from said outermost surface, such that in use, when exposed to a primary magnetic field generated by an external magnetic source positioned above the pathway, the quantity of said conductive material used is sufficient to create an induced magnetic field which repels the magnetic field of said external magnetic source, said induced magnetic field being sufficient to create an in use suspension or levitation of the external magnetic source away from, and above, the outermost surface of the pathway, and wherein the conductive material is in particulate form when arranged as a component of the pathway.

11. The transportation pathway as claimed in claim 10, wherein the disposition of the conductive material on or within the pathway is arranged to influence motion of the external magnetic source along the pathway.

12. The transportation pathway as claimed in claim 10, wherein the conductive material is one or more of the group comprising: electrically conductive material, superconductive material, diamagnetic material.

13. The transportation pathway as claimed in claim 10, wherein the particulate form is one or more of the group comprising: powder, crystals, granules, flakes, fibres, microtubules, nano-materials, or aggregates thereof, and wherein the particulate material includes one or more of the group: graphene, graphene oxide, graphite oxide, layered graphene, reduced graphene oxide, graphite nanoplatelets, graphite nanosheets and graphite nanoflakes.

14. A transportation pathway comprising a quantity of a conductive material on an outermost surface of the pathway, or within the body of the pathway at a depth from said outermost surface,
  such that in use, when exposed to a primary magnetic field generated by an external magnetic source positioned above the pathway, the quantity of said conductive material used is sufficient to create an induced magnetic field which repels the magnetic field of said external magnetic source,
  said induced magnetic field being sufficient to create an in use suspension or levitation of the external magnetic source away from, and above, the outermost surface of the pathway, and
  wherein the conductive material is in liquid form when arranged as a component of the pathway.

15. The transportation pathway as claimed in claim 14, wherein the liquid form is one or more of the group comprising: emulsion, sprayed-on liquid, liquid coating, paint, gel.

16. The transportation pathway as claimed in claim 14, wherein the liquid form is a bituminous material such as bitumen binder, asphalt cement, bitumen emulsion, and wherein the bituminous material includes particulates of one or more of the group: graphene, graphene oxide, graphite oxide, layered graphene, reduced graphene oxide, graphite nanoplatelets, graphite nanosheets and graphite nanoflakes.

17. A method of forming a transportation pathway which is arranged in use for guidance of the motion of a device, the method comprising the steps of:
  selecting a conductive material, being in a particulate form or in a liquid form when arranged as a component of the pathway; and
  arranging an amount of said conductive material on an outermost surface of the pathway, or within the body of the pathway at a depth from said outermost surface, and in a pre-determined disposition;
  such that in use, when exposed to a primary magnetic field generated by an external magnetic source positioned in the device when located above the pathway, the amount of said conductive material used is sufficient to create an induced magnetic field which repels the magnetic field of said external magnetic source, said induced magnetic field being sufficient to create an in use suspension or levitation of the external magnetic source and the device away from, and above, the outermost surface of the pathway, and
  wherein, when the device is levitated, said pre-determined disposition of conductive material guides the motion of the device relative to the pathway.

18. The method as claimed in claim 17, wherein the formation of the pathway is performed in a continuous laying process.

19. The method as claimed in claim 17, wherein the pre-determined disposition of the conductive material on or within the pathway is arranged to influence motion of the external magnetic source along the pathway.

20. The method as claimed in claim 17, wherein the pre-determined disposition of the conductive material on or within the pathway is arranged to influence motion of the external magnetic source to remain located above the pathway.

* * * * *